United States Patent [19]
Nagai et al.

[11] Patent Number: 5,992,597
[45] Date of Patent: Nov. 30, 1999

[54] MULTIPLE DISK CLUTCH AND METHOD AND APPARATUS FOR FORMING CLUTCH DRUM

[75] Inventors: Hideyuki Nagai; Noah Utsumi; Yasuhito Ogasawara; Hirotoshi Ohkubo, all of Anjo, Japan

[73] Assignee: Aisin Aw Co., Ltd., Japan

[21] Appl. No.: 09/081,142

[22] Filed: May 19, 1998

[30] Foreign Application Priority Data

May 30, 1997 [JP] Japan .................................. 9-156161

[51] Int. Cl.⁶ ...................... F16D 25/0638; B21H 1/00
[52] U.S. Cl. ............................... 192/85 AA; 29/893.32; 192/70.2; 192/109 F; 72/208
[58] Field of Search ....................... 192/85 AA, 109 F, 192/70.2; 29/893.32; 72/82, 208

[56] References Cited

U.S. PATENT DOCUMENTS

| | | | |
|---|---|---|---|
| 4,371,066 | 2/1983 | Fujioka et al. | 192/85 AA |
| 4,705,150 | 11/1987 | Hill | 192/70.2 |
| 5,384,949 | 1/1995 | Wodrich et al. | 192/70.2 X |
| 5,881,856 | 3/1999 | Prater | 192/70.2 X |

FOREIGN PATENT DOCUMENTS

| | | |
|---|---|---|
| 1303321 | 12/1989 | Japan . |
| 576982 | 3/1993 | Japan . |
| 538248 | 9/1993 | Japan . |
| 623461 | 2/1994 | Japan . |
| 7265990 | 10/1995 | Japan . |
| 839180 | 2/1996 | Japan . |
| 8300083 | 11/1996 | Japan . |

*Primary Examiner*—Rodney H. Bonck
*Attorney, Agent, or Firm*—Lorusso & Loud

[57] ABSTRACT

A multiple disk clutch includes a clutch drum having an interior surface with a plurality of spline grooves, a servo piston, a clutch plate with splines engaged within the spline grooves, and a cushion plate, with splines engaged within the spline grooves, arranged between the clutch plate and the servo piston. The splines of the clutch plate and those of the cushion plate are engaged within different spline grooves so that the splines of the clutch plates and those of the cushion plate do not contact each other when the clutch is engaged by a load imposed by operation of the piston.

8 Claims, 6 Drawing Sheets

MULTIPLE DISK CLUTCH AND METHOD AND APPARATUS FOR FORMING CLUTCH DRUM

BACKGROUND OF THE INVENTION

1. Field of the Invention

The invention relates to a multiple disk clutch and to a method and an apparatus for forming the clutch drum of the multiple disc clutch.

2. Description of the Related Art

Multiple disc clutches are integrated into gear trains of automatic transmissions and selectively transmit power between rotational components. A typical multiple disc clutch includes a clutch drum housing a hydraulic servo therein, a clutch hub arranged radially inward of the clutch drum, and clutch plates arranged between the clutch drum and the clutch hub. The multiple disc clutch is engaged when the piston of the hydraulic servo is pushed against the clutch plates by application of a hydraulic pressure. In this manner the drive plates, usually separator plates, are pressed against driven plates, usually frictional discs. When the clutch is engaged, a small axial vibration (hereinafter "shudder") is produced in the piston of the hydraulic servo because of pulsation of the applied hydraulic pressure. Therefore, when the piston pushes directly against the plates, the vibration is transmitted to the plates. Especially, when torque transmission is started by engagement of the clutch, a shudder occurs due to change of the engagement pressure. For reducing the shudder produced by the pulsation of the hydraulic pressure, a cushion plate is arranged between the piston and the clutch plates.

The separator plates of the multiple disc clutch are annular discs and, as shown in FIG. 9, have a plural number of splines 21' projecting outward. The separator plates are movable axially relative to the clutch drum but are held against rotation relative to the clutch drum by splined engagement between the splines 21' and the spline grooves 11' formed on the inner surface of the clutch drum. The cushion plate is formed as an annular disc spring and has a plural number of splines 31' formed projecting outward, like those of the separator plates. The cushion plate is movable axially relative to the clutch drum but is held against rotation relative to the clutch drum by splined engagement between the splines 31' and spline grooves 11'. The cushion plate cushions and transmits the applied pressure from the servo piston to the separator plates. The cushion plate has a predetermined camber between its outer periphery and its inner periphery. Due to the configuration of the cushion plate, the load is transmitted by contact between the inner periphery of the cushion plate and the piston and between the outer periphery of the cushion plate and the separator plates. A predetermined spring characteristic is thereby provided by the cushion plate.

In the conventional multiple disk clutch, the predetermined spring characteristic of the cushion plate is set without consideration for contact at the splines. But, because the spline projections 31' of the cushion plate and the spline projections 21' of the clutch plates are in contact within the common spline grooves 11', the load on the clutch plates is reduced. Further, a predetermined spring characteristic of the cushion plate cannot be maintained during the piston stroke because the cushion plate is an annular disk spring having a predetermined camber and the spring force differs radially across the area of the cushion plate contacting the clutch plate.

To prevent the splines 31' of the cushion plate from contacting the clutch plates, it has been proposed to form tapers on the splines 31' of the cushion plate. However, this approach adds to the cost of manufacture.

SUMMARY OF THE INVENTION

In view of the above problems associated with the aforementioned related art, a first object of the invention is to provide a multiple disk clutch which reduces the shock and shudder which occurs upon engagement of the multiple disk clutch.

A second object of the invention is to provide, at low cost, a structure in which the splines of the clutch plates and the splines of the cushion plate are not in contact.

A third object of the invention is to prevent the splines clutch plates and the cushion plate from becoming engaged in the wrong grooves of the clutch drum, thus reducing shudder.

A fourth object of the invention is to provide a method for forming the clutch drum of the multiple disk clutch which prevents the splines of the clutch plates and cushion plate from becoming engaged in the wrong grooves.

A fifth object of the invention is to provide an apparatus for performing the aforementioned forming method.

To achieve the foregoing objects, the present invention provides a multiple disk clutch which includes a clutch drum having a plurality of spline grooves formed on its interior surface, a piston which is arranged for axial movement within the clutch drum, a clutch plate which has splines engaged within the spline grooves so that it is axially movable but not rotatable relative to the clutch drum, and a cushion plate which has splines engaged in the spline grooves so that the cushion plate is likewise axially movable but not rotatable relative to the clutch drum. The cushion plate is positioned between the piston of the hydraulic servo and the clutch plates. The cushion plate is arranged so that the splines of the cushion plate are not in axial contact with the splines of any clutch plate.

The spline grooves of the clutch drum comprises separate first and second sets of spline grooves for receiving, respectively, the splines of the clutch plate and the splines of the cushion plate.

The spline grooves for the clutch plate or the spline grooves for the cushion plate are wider and more shallow than the other spline grooves. The splines of the clutch plate are fitted within the spline grooves for the clutch plate, and the splines of the cushion plate are fitted within the spline grooves for the cushion plate.

The method for forming a clutch drum according to the present invention includes the steps of fixing a sheet metal blank on the end of a mandrel, rotating the mandrel with the sheet metal blank and pressing the blank against the outer cylindrical surface of the mandrel using a plurality of rollers. The mandrel has projections for forming first spline grooves having a relatively wide width and shallow depth and projections for forming second spline grooves having a relatively narrow width and deep depth at different, alternating and spaced circumferential positions.

The apparatus of the present invention for forming a clutch drum includes a mandrel with an outer cylindrical surface which has projections for forming first spline grooves having wide width and shallow depth and projections for forming second spline grooves having narrow width and deep depth at different, alternating and spaced positions around the outer cylindrical surface, a fixing device which fixes the blank on the end of the mandrel, and a plurality of rollers which press the blank against the outer surface of the mandrel.

According to the invention, in the multiple disk clutch, the splines of the clutch plate and those of the cushion plate do not contact each other. Therefore, a reduction in load because of contacting splines is prevented. As a result, the cushion plate provides a predetermined load, and shock or shudder which occurs upon engagement of the multiple disk clutch is reduced.

Further, the spline grooves of the clutch drum for the cushion plate are separated from those for the clutch plates. Therefore, a reduction of load because of contacting splines is prevented. As a result, the cushion plate serves as a cushion providing a predetermined load, and shock and/or shudder occurring at the time of engagement of the multiple disk clutch is reduced.

Further, the spline grooves for the clutch plates or the spline grooves for the cushion plate are wider and more shallow than the other spline grooves, and the clutch plates and the cushion plate have splines which respectively mate only with one of the two different sets of spline grooves. Therefore, the clutch plates and the cushion plate can not be assembled with their splines in the same spline grooves. As a result, assembly with the clutch plates and the cushion plate splines engaged, respectively, in separated spline grooves is assured, thus facilitating assembly and assuring that the splines of the cushion plate will not contact the splines of any clutch plate.

Further, the two sets of differently dimensioned spline grooves are formed on the inner cylindrical surface of a cylindrical blank (formed from a sheet blank) with only one forming process. Further, the forming method of the present invention may use a sheet metal blank having a higher rigidity as compared with the sheet metal typically used in press forming, to produce a clutch drum having high rigidity.

Further, the mandrel has first projections for forming the first spline grooves having wide width and shallow depth and second projections for forming the second spline grooves having narrow width and deep depth. Therefore, the interior splined surface, comprising the first spline grooves having wide width and shallow depth and the second spline grooves having narrow width and deep depth, is formed on the inner surface of the cylindrical blank by only cold flow forming. As a result, the clutch drum, which prevents the clutch plates and the cushion plate from becoming engaged in the wrong spline grooves and reduces shock and/or shudder occurring at the time of engagement of the multiple disk clutch, can be formed at low cost.

BRIEF DESCRIPTION OF THE DRAWINGS

The invention will be described in conjunction with the following drawings in which like features are designated with like reference characters, and wherein.

DETAILED DESCRIPTION OF THE INVENTION

The invention will become more apparent from the following detailed description of preferred embodiments with reference to the accompanying drawings.

Figure 1:
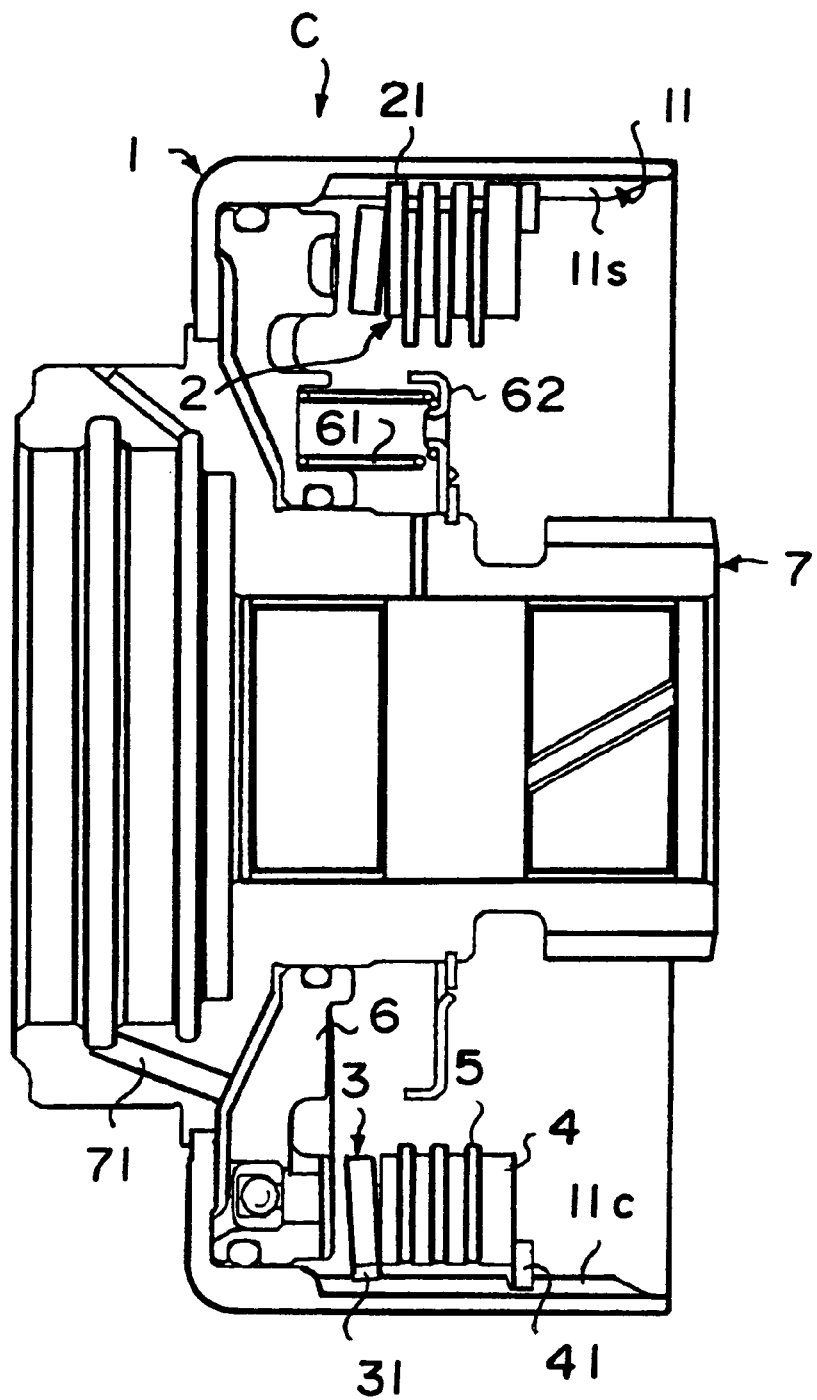
FIG. 1 is an axial sectional view showing an embodiment of a multiple disk clutch of the invention.

FIG. 1 shows a cross section of a multiple disk clutch according to one embodiment of the invention, with omission of various components including the hub. The multiple disk clutch C is shown as including a clutch drum 1 having an interior cylindrical surface on which splines are defined by a plural number of spline grooves 11 and a servo piston 6 arranged within the clutch drum 1 for axial, reciprocating movement relative thereto. The clutch plates are shown as including separator plates 2 which are axially movable but not rotatable relative to the clutch drum due to engagement of splines 21, which project outward from the separator plates, within the spline grooves 11. A cushion plate 3 is positioned between the servo piston 6 and the separator plates 2 and is held against rotation relative to the clutch drum 1 by splines 31 which project outward from the cushion plate into the spline grooves 11.

According to the invention, the splines 21 of the separator plates 2 and the splines 31 of the cushion plate 3 are arranged so that they are not in contact with each other. Specifically, spline grooves 11s receive the splines 21 of the separator plates 2 as shown in upper portion of FIG. 1 and spline grooves 11c receive the splines 31 of cushion plate 3 as shown in lower portion of FIG. 1. In this manner splines 21 are circumferentially spaced from and alternate with splines 31.

In FIG. 1, reference numeral 4 denotes a backing plate, reference numeral 41 denotes a snap ring for preventing axial movement of the backing plate 4, reference numeral 5 denotes frictional disks, reference numeral 61 denotes a return spring for the servo piston 6, reference numeral 62 denotes a spring seat for the return spring 61, and reference numeral 7 denotes an input shaft member, which forms the hub of the clutch C and a sun gear S connected to the hub. The input shaft member 7 is integrated with the clutch drum 1 by, for example, welding.

Figure 2:
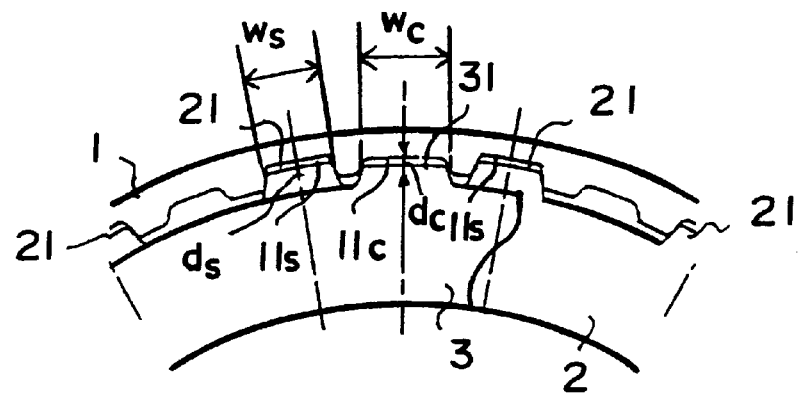
FIG. 2 is a partial sectional view of the multiple disk clutch of FIG. 1.
Figure 3:
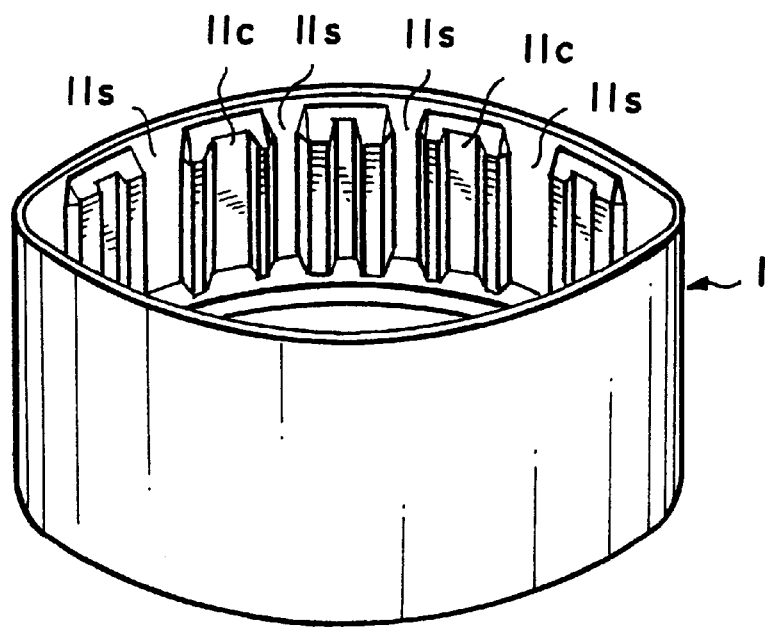
FIG. 3 is a perspective view of the drum of the multiple disk clutch.

As shown in the partial sectional view of FIG. 2 and the perspective view of FIG. 3, the sets of spline grooves 11s and 11c of the clutch drum 1 differ from each other in width and depth. In this embodiment, the spline grooves 11c which receive the splines 31 of the cushion plate 3 are wider and more shallow than the spline grooves 11s which receive the splines 21 of the separator plates 2. Thus, if the width of the spline grooves 11s is designated as $w_s$, the width of the spline grooves 11c designated as $w_c$, the depth of the spline grooves 11s designated as $d_s$, and the depth of the spline grooves 11c designated as $d_c$, their relationship may be represented as $w_c > w_s$ and $d_c < d_s$. The splines 31 of the cushion plate 3, which is closest to the closed back portion of the clutch drum 1, have a wider width for mating with the spline grooves 11c. The splines 21 of the separator plates 2, which in assembly are inserted from the opening side of the clutch drum 1 after insertion of cushion plate 3, have a greater radial dimension in order to fit the spline grooves 11s. Therefore, the splines 31 have too wide a width to fit within the spline grooves 11s for receiving splines 21 of the separator plates 2, and the splines 21 extend too far radially to fit within the spline grooves 11c for receiving splines 31 of the cushion plate 3. In this manner, the present invention prevents the splines 21 and the splines 31 from becoming engaged in the wrong spline grooves. In the multiple disk clutch C having the cushion plate 3 and the separator plates 2 correctly inserted into the clutch drum, the splines 31 are not in contact with splines 21. Therefore, the separator plates 2 and the cushion plate 3 are in contact at their outside peripheries as set, whereby the load of the piston is transmitted through these contracting, outer peripheral areas, and shudder is effectively reduced.

In the embodiment of the multiple disk clutch having the structure described above, the servo piston 6 is pushed against the return spring 61 by applying a hydraulic pressure from a oil passage formed in the input shaft 7. At that time, the piston 6 comes into contact with the radially inward portion of the cushion plate 3, and a load is transmitted from the piston 6 to the cushion plate 3 and from the outer peripheral portion of the cushion plate 3 to the outer peripheral portions of the separator plates 2. Because the splines 31 of the cushion plate 3 do not contact the splines 21 of the separator plates 2, the transmitted load is not reduced by such contact. In contrast, in the related art, the portion of the separator plate 2 which transmits the load changes from the ends of the splines 21 to the outer peripheral portion by change of shape of the cushion plate 3. However, in this embodiment, the portion of the separator plate 2 which transmits the load remains at the outer peripheral portion. Therefore, the spring constant of the cushion plate 3 maintains its original value during the piston stroke.

In the engagement of the multiple disk clutch C, the friction disks 5 are pressed between the separator plates 2 and the backing plate 4, and the torque input to the drum 1 is transmitted from the separator plates 2 to the clutch hub (not shown) through the friction disks 5. In the power transmission (engaged) state, the thrust load of the piston 6 is transmitted from the cushion plate 3 to the backing plate 4 through the separator plates 2 and the friction disks 5, and is further transmitted to the drum 1 through a snap ring 41, and balances with the reaction force of the hydraulic pressure applied to the hydraulic servo. The reaction force is exerted on the drum 1 in the direction to the left in FIG. 1.

Figure 4:
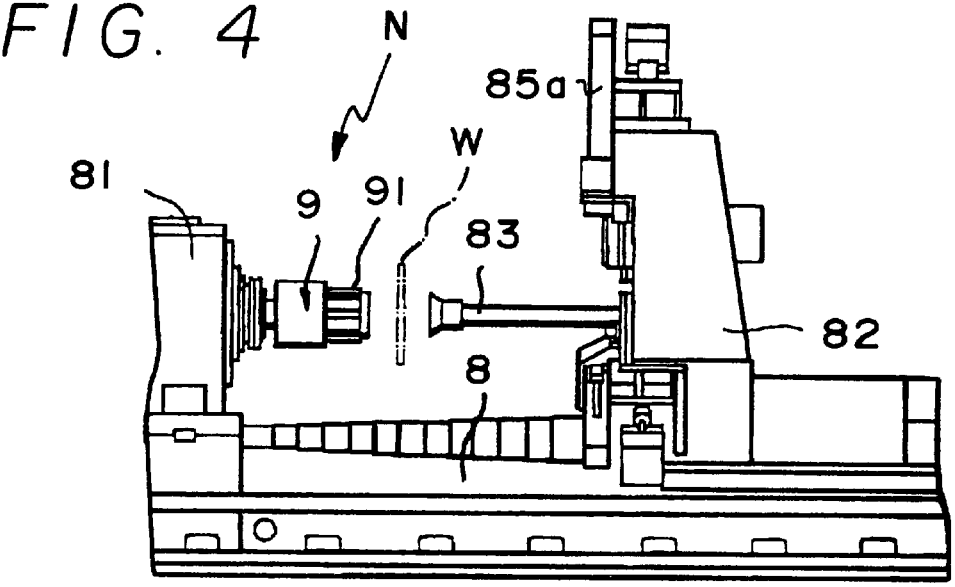
FIG. 4 is a side view of a forming apparatus of the invention.
Figure 5:
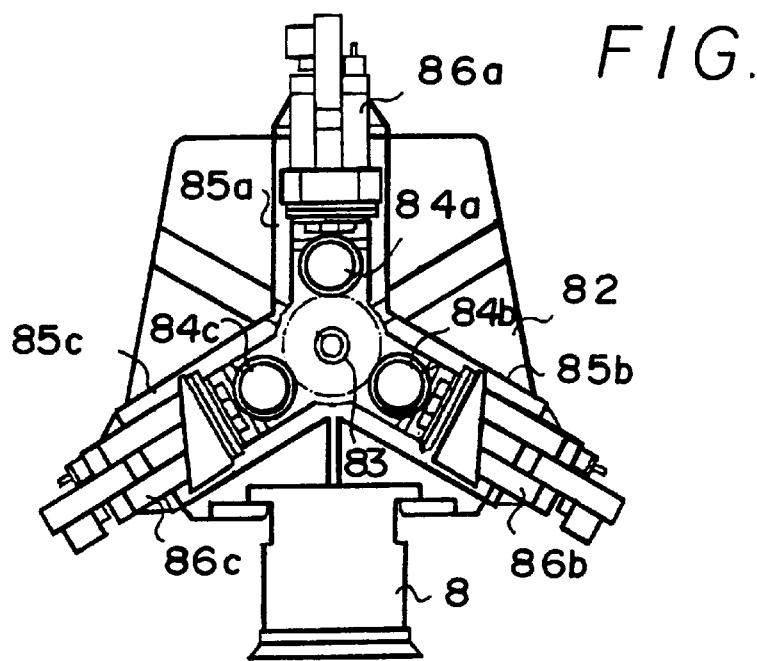
FIG. 5 is an elevational view of the carriage of the forming apparatus of FIG. 4.

FIG. 4 and FIG. 5 show an apparatus N for forming the clutch drum 1 of the multiple disk clutch C. This apparatus N, which is a cold flow forming apparatus, includes a headstock 81 and a carriage 82 arranged opposite each other on a base 8. A mandrel 9 is fixed on a chuck of a shaft rotatably driven by the headstock 81. A tail stock 83 holds a blank W against the end of the mandrel 9 and is rotatably supported and axially movably by the carriage 82. The mandrel 9 and the tail stock 83 are arranged so that they are coaxial. Three rollers 84a, 84b, 84c, that press the blank W onto the outer surface of the mandrel 9, are supported by the carriage 82 through sliders 85a, 85b, 85c. The rollers 84a, 84b, 84c are arranged equally spaced in a circle centered on the shaft center. Further, the rollers 84a, 84b, 84c are radially movable against the mandrel 9 by operation of the hydraulic cylinders 86a, 86b, 86c. The headstock 81 and the carriage 82 are axially movable relative to each other. In this embodiment, the headstock 81 is moved toward and away from the carriage 82 on the base 8.

Figure 6:
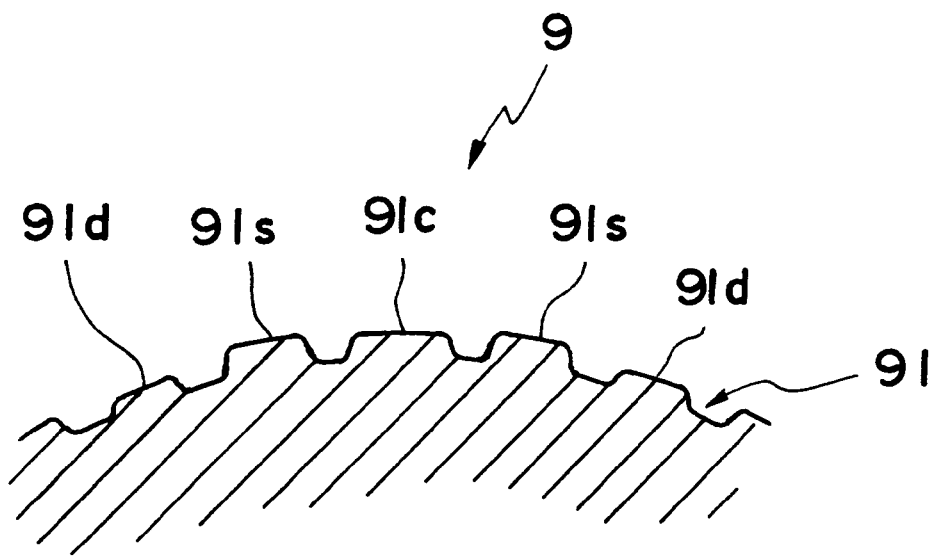
FIG. 6 is a partial sectional view of the mandrel of the forming apparatus of FIG. 4.

As shown in FIG. 6, the mandrel 9 has inner spline forming portions 91. According to the invention, the inner spline forming portions 91 include projections 91c, of wide width and low height for forming the spline grooves having wide width and shallow depth, and projection 91s, of narrower width and higher height for forming the spline grooves having narrow width and deep depth. In this embodiment, the 9 projections 91c are equally spaced around the outer surface of the mandrel 9. Anywhere from 3 through 18 projections 91c may be provided. The 18 projections 91s are also equally spaced around the outer surface of the mandrel 9. Projections 91d are also provided on the outer surface of the mandrel for forming grooves which equalize cold flow of the blank W.

Figure 7:
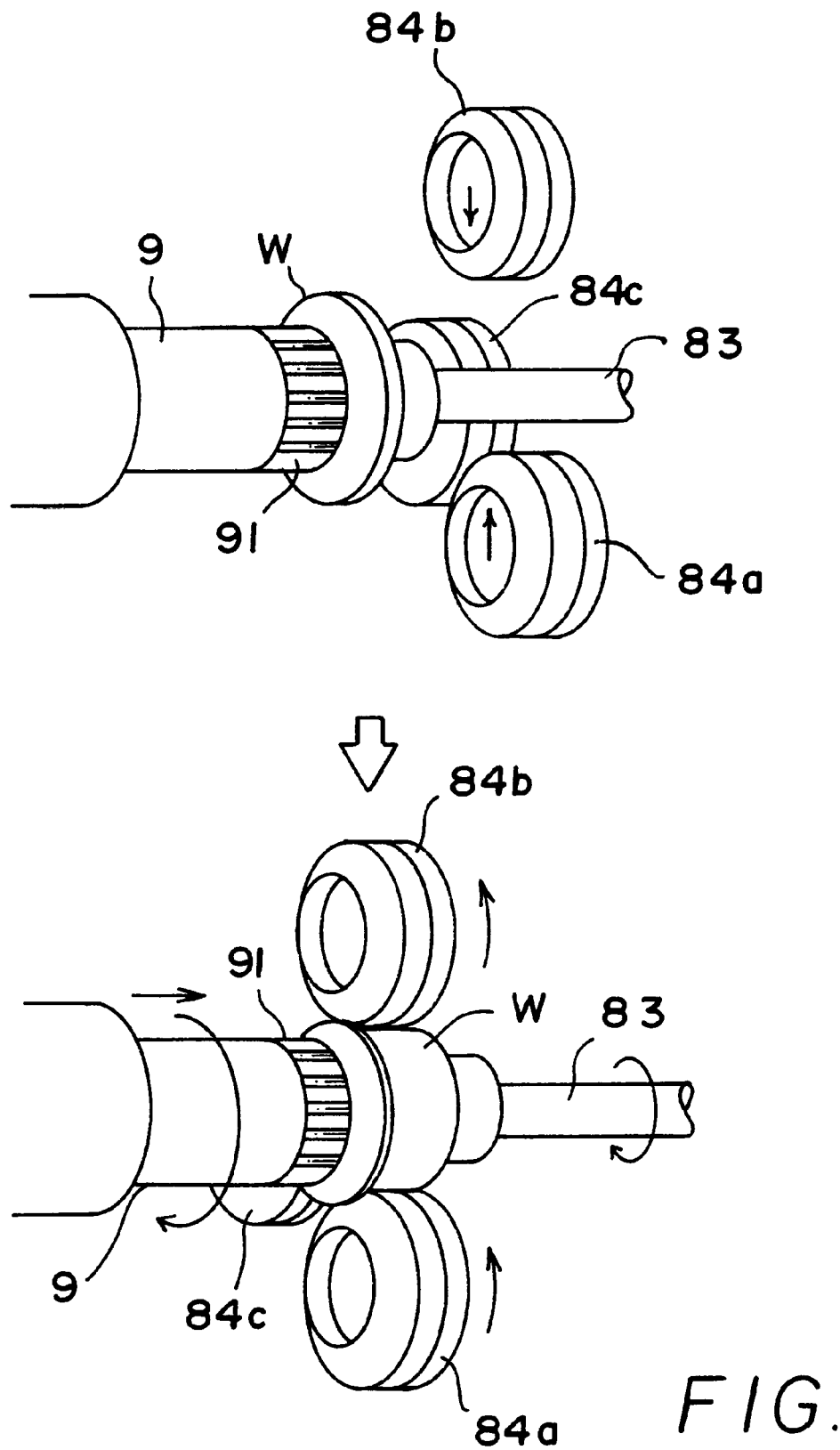
FIG. 7 is a perspective view illustrating the forming method of the invention.

A method for forming the clutch drum of the multiple disk clutch C will now be explained. As shown in FIG. 7, the blank W is a circular steel plate having a higher rigidity than a blank typically used in press working. In the forming process, the blank W is fixed on the end of the mandrel 9 by pressing with the tail stock 83. Then, the mandrel 9 is rotated with the tail stock 83, and the peripheral portion of the blank W is pressed against the outer surface of the mandrel 9 by the plurality of rollers. In this manner, the cup shape of the clutch drum is formed.

In this embodiment, the plural rollers are 3 in number and are arranged surrounding mandrel 9. The 3 rollers are a rough finishing roller 84a, a semi finishing roller 84b, and a finishing roller 84c. These rollers are arranged so that their axial positions are all different. The rough finishing roller 84a is arranged in a forward position, the semi finishing roller 84b is arranged in a middle position, and the finishing roller 84c is arranged in a rear position. In forming, the radial positions of these rollers are also different from each other. Therefore, each roller performs a different function, i.e. rough finishing, semi finishing, and finishing, respectively, and the cup shape may be formed in one complete rotation of the blank W fixed on the mandrel 9.

Figure 8:
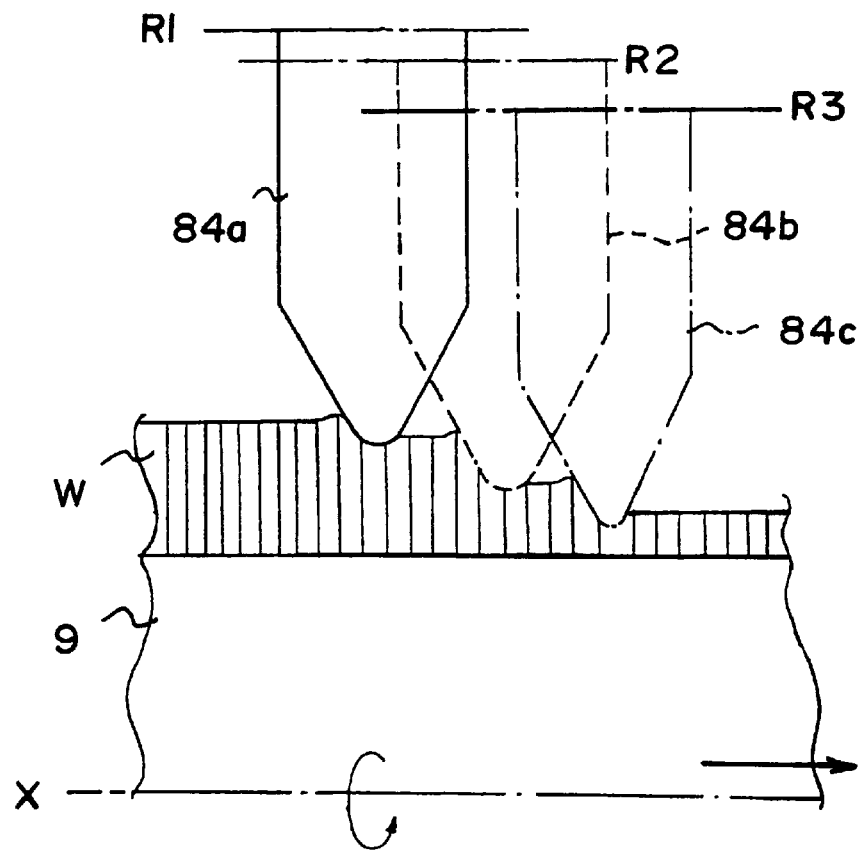
FIG. 8 is a sectional view illustrating the forming method of the invention.
Figure 9:
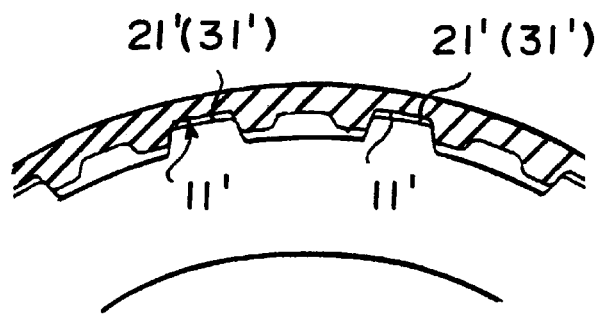
FIG. 9 is a partial sectional view of the multiple disk clutch of the related art.

FIG. 8 illustrates the function of each roller. In FIG. 8, a left-hand portion of the blank W is shown in its state before forming, and the right-hand portion of the blank W is shown in its state after forming. As shown in FIG. 8, the rough finishing roller 84a is arranged at a radial position R1, and the semi finishing roller 84b is arranged at a radial position R2 which is closer than the position R1 to the axial center X of the mandrel 9, and the finishing roller 84c is arranged at a radial position R3 which is closer than the position R2 to the axial center X of the mandrel 9. As the mandrel 9 rotating with blank W is moved toward these rollers 84a, 84b, 84c, the blank W is pressed against the outer surface of the mandrel 9. By this cold forming, the spline grooves are gradually formed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multiple disk clutch comprising:

a clutch drum having an interior cylindrical surface with a plurality of spline grooves;

a piston mounted in said clutch drum for axial movement therein;

a clutch plate mounted in said clutch drum and having a first set of splines engaged in the spline grooves so that said clutch plate is axially movable but not rotatable relative to the clutch drum; and a cushion plate mounted within said clutch drum between said piston and said clutch plate, said cushion plate having a second set of splines engaged in the spline grooves so that the cushion plate is axially movable but not rotatable relative to the clutch drum, the second set of splines being arranged relative to the first set of splines so that the splines of the first set do not contact the splines of the second set when said piston exerts an axial load on said clutch plate and said cushion plate.

2. The multiple disk clutch according to claim 1, wherein the spline grooves of the clutch drum comprise first and second sets of spline grooves for separately engaging, respectively, the first and second sets of splines.

3. The multiple disk clutch according to claim 2, wherein the spline grooves of a designated set of the first and second sets of spline grooves are wider and more shallow than the spline grooves of the other of the first and second sets of spline grooves, and wherein the splines of one of the first and second sets of splines are wider and shorter than the splines of the other of the first and second sets of splines and mate with the spline grooves of said designed set, whereby each set of splines will fit within one of the first and second sets of spline grooves but not within the other of the first and second sets of spline grooves.

4. The multiple disk clutch according to claim 2 wherein the spline grooves of said first set of spline grooves are circumferentially spaced from and alternate with the spline grooves of said second set of spline grooves.

5. The multiple disk clutch according to claim 3 wherein the spline grooves of said first set of spline grooves are circumferentially spaced from and alternate with the spline grooves of said second set of spline grooves.

6. A method for forming a clutch drum comprising steps of:

fixing a sheet metal blank on the end of a mandrel;

rotating the mandrel with the blank; and pressing the blank against the outer surface of the mandrel, which outer surface has projections for forming first and second sets of spline grooves, the spline grooves of one set of spline grooves being wider and more shallow than the spline grooves of the other set of spline grooves, the projections for the first set of spline grooves being spaced from and alternating with the projections for the second set of spline grooves around the circumference of the mandrel, said pressing being by contact of the blank with a plurality of rollers to form a cup-shaped clutch drum with an interior cylindrical surface having first and second sets of spline grooves corresponding to said projections.

7. An apparatus for forming a clutch drum comprising:

a mandrel which has an outer cylindrical surface with first and second sets of projections for forming first and second sets of spline grooves in an interior circumferential surface of a cup formed from a sheet metal blank, the projections of the first set being narrower and higher than the projections of the second set and the projections of the first set being spaced from and alternating with the projections of the second set around the circumference of the outer cylindrical surface of said mandrel;

a fixing device for holding the sheet metal blank on the end of the mandrel; and a plurality of rollers for pressing the sheet metal blank against the outer cylindrical surface of the mandrel.

8. A multiple disk clutch comprising: a cup-shaped clutch drum having an interior cylindrical surface with a plurality of spline grooves; a piston mounted in said clutch drum for axial movement therein; a clutch plate mounted in said clutch drum and having a first set of splines engaged in the spline grooves so that said clutch plate is axially movable but not rotatable relative to the clutch drum; and a cushion plate mounted within said clutch drum between said piston and said clutch plate, said cushion plate having a second set of splines engaged in the spline grooves so that the cushion plate is axially movable but not rotatable relative to the clutch drum, the second set of splines being arranged relative to the first set of splines so that the splines of the first set do not contact the splines of the second set when said piston exerts an axial load on said clutch plate and said cushion plate, said multiple disk clutch being made by a process comprising:

fixing a sheet metal blank on the end of a mandrel;

rotating the mandrel with the blank; and pressing the blank against the outer surface of the mandrel, which outer surface has projections for forming the first and second sets of spline grooves, the spline grooves of one set of spline grooves being wider and more shallow than the spline grooves of the other set of spline grooves, the projections for the first set of spline grooves being spaced from and alternating with the projections for the second set of spline grooves around the circumference of the mandrel, said pressing being by contact of the blank with a plurality of rollers to form the cup-shaped clutch drum with the interior cylindrical surface having the plural spline grooves formed as first and second sets of spline grooves corresponding to said projections.

* * * * *